United States Patent [19]

Stubben

[11] 4,129,883
[45] Dec. 12, 1978

[54] APPARATUS FOR GENERATING AT LEAST ONE MOVING OBJECT ACROSS A VIDEO DISPLAY SCREEN WHERE WRAPAROUND OF THE OBJECT IS AVOIDED

[75] Inventor: David R. Stubben, Santa Clara, Calif.

[73] Assignee: Atari, Inc., Sunnyvale, Calif.

[21] Appl. No.: 862,680

[22] Filed: Dec. 20, 1977

[51] Int. Cl.² .................................................. H04N 7/18
[52] U.S. Cl. .................................... 358/104; 273/101.2; 273/85 G
[58] Field of Search ...................... 35/11 A, 12 N, 25; 273/1 E, 85 G, DIG. 28, 101.2; 358/104, 165

[56] References Cited

U.S. PATENT DOCUMENTS

| 3,507,989 | 4/1970 | Wolff ................................... 358/104 |
| 3,525,804 | 8/1970 | Owen ................................... 358/104 |
| 4,016,362 | 4/1977 | Bristow et al. ........... 273/DIG. 28 X |
| 4,045,789 | 8/1977 | Bristow .................... 273/DIG. 28 X |
| 4,054,919 | 10/1977 | Alcorn ..................... 273/DIG. 28 X |

Primary Examiner—Harvey E. Springborn
Attorney, Agent, or Firm—Townsend and Townsend

[57] ABSTRACT

In a video game where an object, such as a ship, moves across the screen and where wraparound exists when the object is displayed near the edge of the screen, binary logic architecture provides for use of only a single bit of data to determine which portion of the object is to be displayed. This allows a standard bit capacity random access memory and horizontal address counter to be utilized in the circuit.

5 Claims, 2 Drawing Figures

APPARATUS FOR GENERATING AT LEAST ONE MOVING OBJECT ACROSS A VIDEO DISPLAY SCREEN WHERE WRAPAROUND OF THE OBJECT IS AVOIDED

BACKGROUND OF THE INVENTION

The present invention is directed to apparatus for generating at least one moving object across a video display screen where wraparound of the object is avoided. More specifically, such wraparound occurs where an object is to be displayed near the edge of the screen (but necessarily only a portion of it can be displayed) and unless precautions are taken both portions of the object may theoretically be displayed one portion at one edge and one portion at the opposite edge.

In order to remedy the foregoing in a video game, where for example, a PT boat is being moved across the screen, one solution has been a logic unit controlling the game which outputs two binary digits or bits which provide four logical states; viz, display the left side of the screen, display the right side, display both, or lastly display neither meaning blank.

Another technique, which is somewhat difficult in application required the use of nine bits of horizontal counter range. This was cumbersome since the efficiency of binary architecture dictates that a four to eight bit unit of incremental change be used.

In addition, with regard to the above-mentioned two bit decoding scheme even the addition of one extra required bit of information may either significantly increase the overall cost of the binary logic required for a video game or alternatively signficantly reduce its flexibility of operation.

OBJECTS AND SUMMARY OF THE INVENTION

It is therefore a general object of the present invention to provide improved apparatus for generating a moving video object.

It is another object of the invention to avoid the foregoing wraparound problem with a minimum of digital logic.

In accordance with the above objects, there is provided apparatus for generating at least one moving object across a video display screen scanned in successive frames by an image forming beam traversing the screen along a plurality of horizontal lines. Undesired wraparound of the object may occur if its location near an edge of such screen requires only a display of a portion of such object. A horizontal memory stores multi-bit data indicative of the desired horizontal location of the object and other bits indicative of the type of object to be displayed. These other bits include only one of which is indicative of which portion of a wrapped around object is to be displayed. Horizontal counting apparatus is responsive to the stored horizontal location and the location of the beam for providing an active video window signal indicative of the location of the object. Decoding logic is responsive to the window signal and the one bit to control the display of the object.

DETAILED DESCRIPTION OF THE PREFERRED EMBODIMENT

Figure 1:
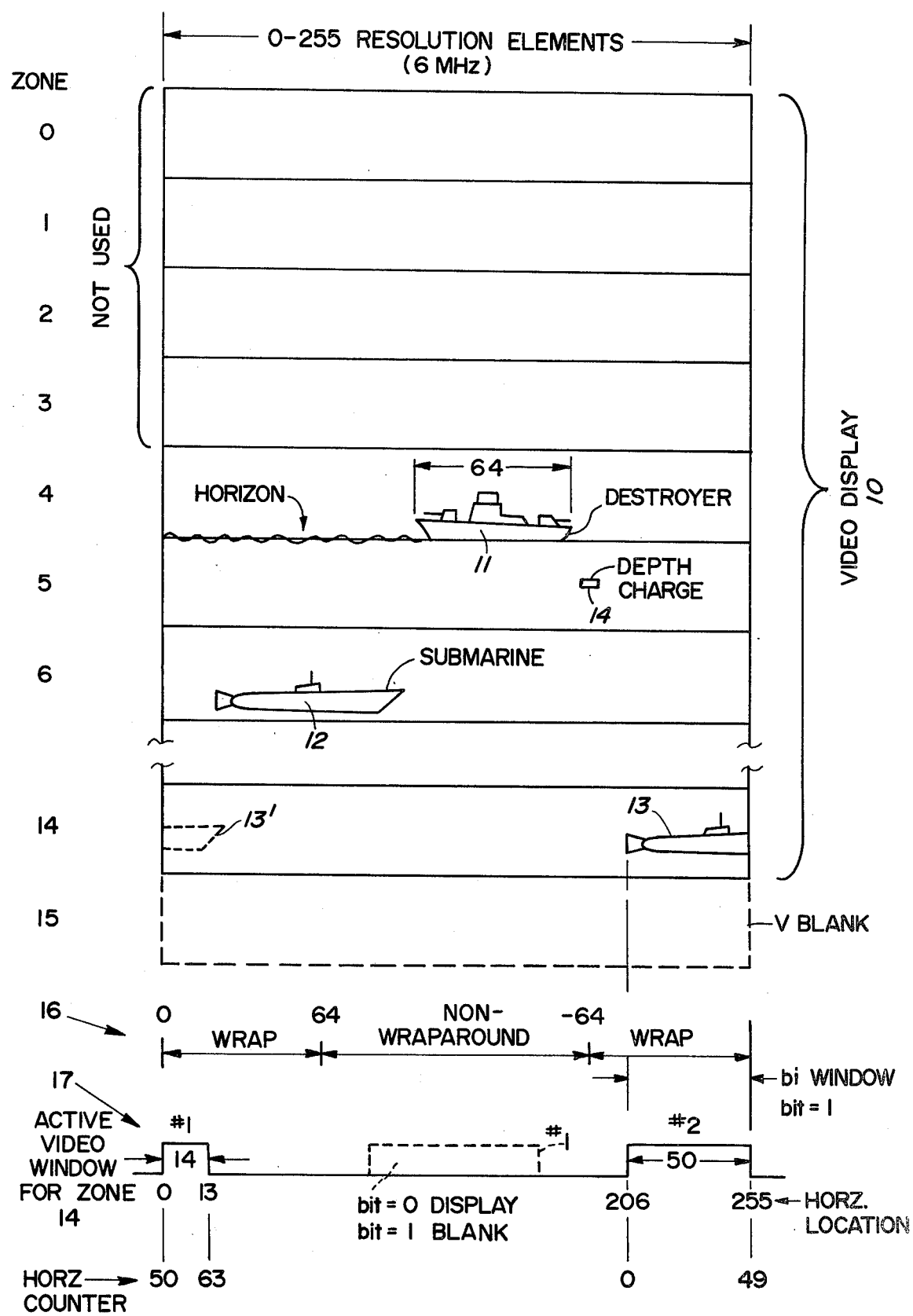
FIG. 1 is a diagrammatic view of a video display screen along with associated timing waveforms related to the horizontal time base of the video display screen.

FIG. 1 illustrates the video game of the present invention where a video display screen 10 includes as displayed objects a destroyer 11 and two submarines 12 and 13. In general, the player operating the destroyer 11 tries to hit enemy submarines with depth charges 14. Each submarine moves across the video display screen in a horizontal band or zone of 16 video lines. There are 16 zones designated 0 through 15. The top three zones are not used and zone 4 is intended as the horizon of the ocean which the destroyer 11 moves across.

Video display screen 10 has 256 resolution elements for each horizontal line (meaning that a six megahertz frequency is used with the standard video raster timing). Each object has a window or width of 64 resolution elements as indicated by the destroyer 11. Zone 15 in dashed outline occurs only during vertical blanking. Only two submarine targets 12, 13 are illustrated but there are, of course, several others which travel at different speeds and different depths below the destroyer.

The scores of the game vary depending upon the level of difficulty; for example, a higher score for a relatively fast moving submarine. The objects may move from left to right or right to left whichever is convenient for the objectives of the game.

The specific provision of the various zones 0 through 15 and the movement of the objects through the zone is disclosed and claimed in a copending application entitled "Apparatus For Generating A Plurality Of Moving Objects On A Video Display Screen Utilizing Associative Memory", U.S. Application Ser. No. 862,337 carrying a filing date of 12/20/67 in the name of the present inventor, and assigned to the present assignee.

Where a horizontal object moves across the video screen the effect that may occur is termed "wraparound"; that is, when for example, object 13 is going off the right edge of the screen unless proper blanking is provided as discussed above, an undesired portion 13' may appear at the other edge of the screen. With an object of 64 resolution elements in width, wraparound will only occur at a distance of 64 elements from the left or right edge with the intermediate center part of the screen being a non-wraparound area as shown by diagram 16.

From a timing standpoint, the wraparound effect is illustrated by the timing diagram 17 where theoretically active video occurs for a window #1 and a window #2 and a choice must be made between which window is actually to be open for display. This, of course, is dependent upon the direction of motion of the object; viz, from left to right as shown or from right to left as for the destroyer 11. The remaining notations on the timing diagrams 16 and 17 will become clearer in conjunction with the circuit block diagram of FIG. 2.

Figure 2:
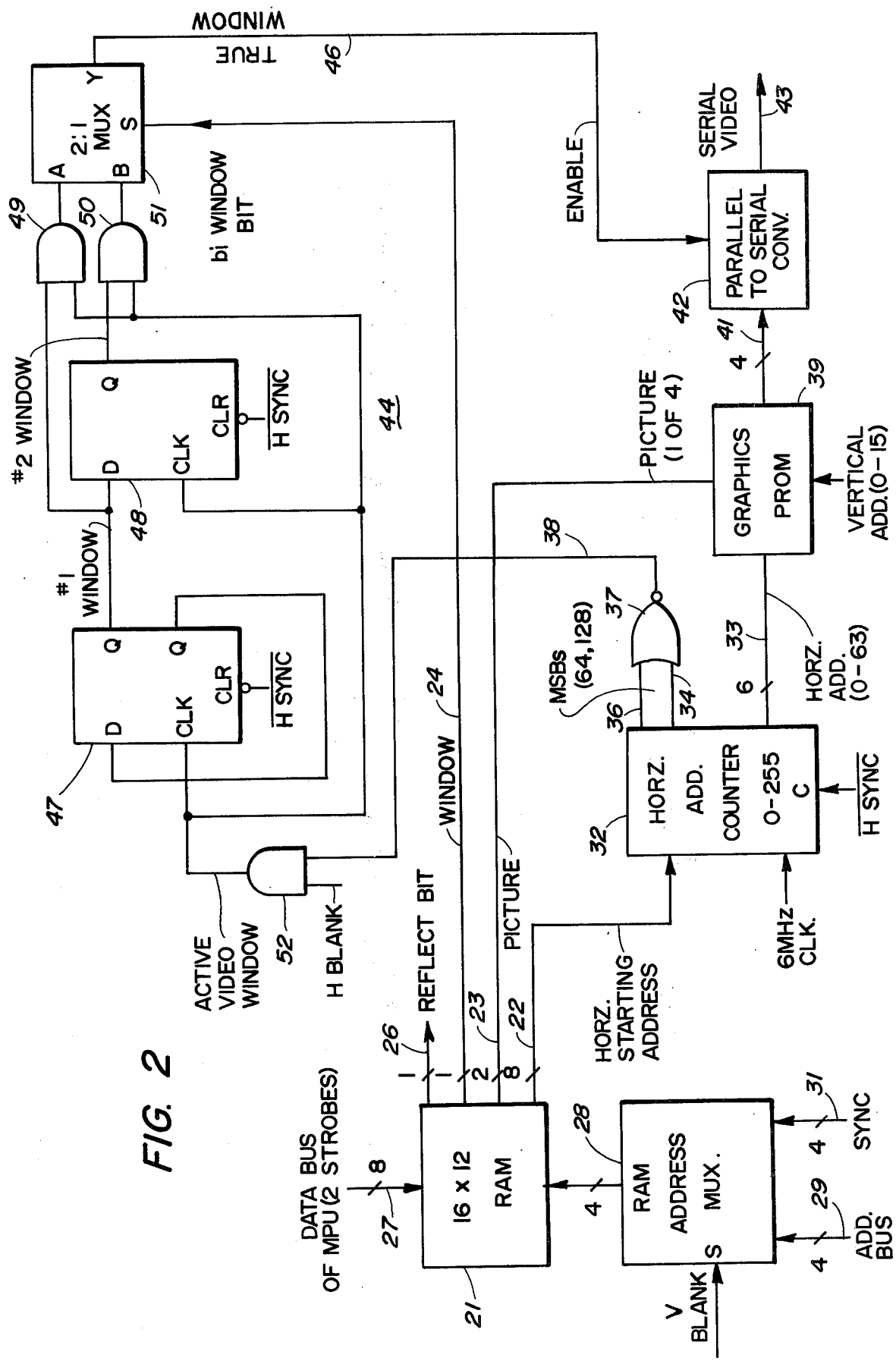
FIG. 2 is a block diagram embodying the present invention.

Referring to FIG. 2, a random access memory 21 is arranged in a logic architecture of 16 by 12 meaning a 12 line or bit parallel output as indicated by the slashes and numbers associated with the output lines and 16 addressable memory locations each of which is associated with a zone 0 through 15. Such association is discussed and claimed in greater detail in the above copending application.

In any case, RAM 21 has as outputs 8 bits of data indicating the horizontal starting address of an object on bus 22, two bits indicating the type of picture on bus 23, one bit of data on line 24 which is termed a biwindow bit and is crucial to the operation of the invention and a last bit on line 26 which acts to reflect an object 180° such as the difference between, referring to FIG. 1, the destroyer 11 which is moving from right to left versus the submarine 12 which is moving from left to right. The above 12 bits of data is inputed or stored in RAM 21 from an eight bit data bus of a microprocessor unit which is not shown. Such storage occurs during vertical blanking as indicated by the RAM address multiplexer 28 where a four line address bus 29 from the microprocessor unit selects the various memory locations for updating via data bus 27. Because of the eight bit input bus 27 this must occur in two strobes or sequences since 12 bits of data are required.

The stored data of RAM 21 is accessed out on the various output lines by the use of the sync bus 31 which multiplexer 28 connects to the RAM 21 to sequentially access in time each of the 16 different memory locations corresponding to each zone of the video display. This is discussed in greater detail in the above copending application. Horizontal starting address bus 22 is connected to a horizontal address counter 32 to load it with the starting address of the object. For example, referring to FIG. 1, this is indicated in conjunction with the timing diagram 17 where the horizontal starting address for object 13 is 50. This is effectively the complement of the desired horizontal location at 206 which is subtracted from the total number of resolution elements of 256. The actual horizontal location of object 13 is best shown in relation to timing diagram 17; that is, starting at 206 and ending at 255 with the other portion 13' of the object, which is not to be displayed, starting at 0 and ending at 13. However at this point in time, the horizontal address counter circuitry does not have the capability of making a determination of which of the wraparound portions 13 or 13' is to be displayed. Thus, horizontal counter 32 which is initially set to start at 50 immediately provides an active video window #1 and later the window #2.

Counter 32 has an 8 bit parallel output consisting of the six line output bus 33 which represents the binary values 1, 2, 4, 8, 16 and 32 and the two most significant bit lines 34 and 36 representing the binary values 64 and 128 which are driving a NOR gate 37. As is apparent from diagram 17 of FIG. 1, the active video windows are indicated by counter 32 and its output bus 33 counting from 0 to 63. During this period lines 34 and 36 are zero. Therefore the output line 38 of NOR gate 37 has a signal on it which is the active video window signal of timing diagram 17. On bus 33 the horizontal addresses 0 through 63 are read out to a graphics PROM 39 which has stored in it video data representing the various objects 11, 12 and 13. The object selected by picture bus 23 is addressed by bus 33 and is transferred via 4 bit bus 41 to a parallel to serial converter 42 to provide a serial video line 43 which is connected with appropriate horizontal and vertical sync timing to video display 10.

In order to determine which portion of object 13 is to be displayed because of the wraparound problem, decoding logic means 44 is provided which receives the active video window on line 38, the biwindow bit on line 24 and provides on its output line 46 a true window enable signal which is connected to parallel to serial converter 42. For example, the enable would only occur during window #2 as illustrated in FIG. 1.

The decoding logic more specifically includes a first D-type flip-flop 47 which on its Q output when true enables the #1 window and a second D-type flip-flop 48 which on its Q output when true enables window #2. These outputs are respectively connected to AND gates 49 and 50 whose outputs are multiplexed by a multiplexer 51; the output of the multiplexer is the true or enable window line 46. The multiplexer is switched by the single biwindow bit on line 24. If the first window is to be chosen the biwindow bit is "0" causing the multiplexer to pass the output of AND gate 49 to line 46; if the second window is to be enabled the biwindow bit is "1" and the multiplexer passes the output of AND gate 50.

In the active video window line 38 is an AND gate 52 having H blank as a second coincidence input to ensure that the circuit is inactive during horizontal blanking. The decoding logic 44 is, of course, cleared during every horizontal blanking interval by the H sync inputs to flip-flops 47 and 48.

Decoding logic 44 also functions in a nonwraparound situation such as shown by the dashed outline window #1 in timing diagram 17 of FIG. 1. Here, of course, the active video line 38 will only produce the dashed window #1 signal. Thus only flip-flop 47 will have a true output as is also true of AND gate 49. In this case, if the biwindow bit on line 24 is "0" it selects the true output of AND gate 49 to allow the object to be displayed. If, however, the biwindow bit is "1", there will be no true output at the output of AND gate 50 and the video display will be blank for that object.

Thus, the biwindow bit on line 24 in effect performs four functions; viz, during wraparound it selects which portion of the object is to be displayed and in a nonwraparound situation whether an object is to be displayed or blanked. Since only one bit is needed, the memory RAM 21 is allowed to have the convenient architecture of 12 output lines or bits. It is obvious that all of the other bits are indispensable since the horizontal starting address requires eight bits in view of the 256 resolution elements, the picture bus 23 requires at least two bits to provide a variety (4) of different objects and, of course, a reflect bit 26 is necessary because of the architecture of the game itself where objects are going in different directions. Furthermore the horizontal address counter 32 provides the active video window on line 38 by a simple NOR gate connection to the two most significant bits of the counter. This is easily achieved since the horizontal width of 64 bits corresponds to an integral binary fraction of the horizontal counter capacity of 256. In other words, there are two readily available taps from the address counter 32.

Thus, the present invention has provided an improved apparatus for generating a moving object across a video display screen.

What is claimed is:

1. Apparatus for generating at least one moving object across a video display screen scanned in successive frames by an image forming beam transversing said screen along a plurality of horizontal lines, where undesired wraparound of said object may occur if its location near an edge of such screen requires only the display of a portion of such object said apparatus comprising: horizontal memory means for storing multi-bit data indicative of the desired horizontal location of said object and other bits indicative of the type of object to be displayed said other bits including only one of which is indicative of which portion of a wrapped around object is to be displayed; means including horizontal counting means responsive to said stored horizontal location and the location of said beam for providing an active video window signal indicative of the location of said object; and decoding logic means responsive to said window signal and said one bit to control the display of said object.

2. Apparatus as in claim 1 together with a microprocessor unit responsive to the desired horizontal location of said object to determine if wraparound will occur and for determining the binary value of said one bit to thereby determine which portion of said object will be displayed.

3. Apparatus as in claim 1 where when the horizontal location of said object does not cause wraparound, said decoding logic means including means responsive to said one bit to selectively blank said object from said video display screen to prevent psuedo objects from being displayed.

4. Apparatus as in claim 1 where 8 bits of data are indicative of said desired horizontal location and said other bits consist of four, two of which determine object picture type, another if the object is to be reflected, and the remaining bit is said one bit.

5. Apparatus as in claim 1 where said object has a horizontal width which corresponds to an integral binary fraction of said horizontal counting means.

* * * * *